Sept. 25, 1928.  G. O. WILMS  1,685,113
MECHANICAL MOVEMENT
Original Filed April 3, 1922   2 Sheets-Sheet 1
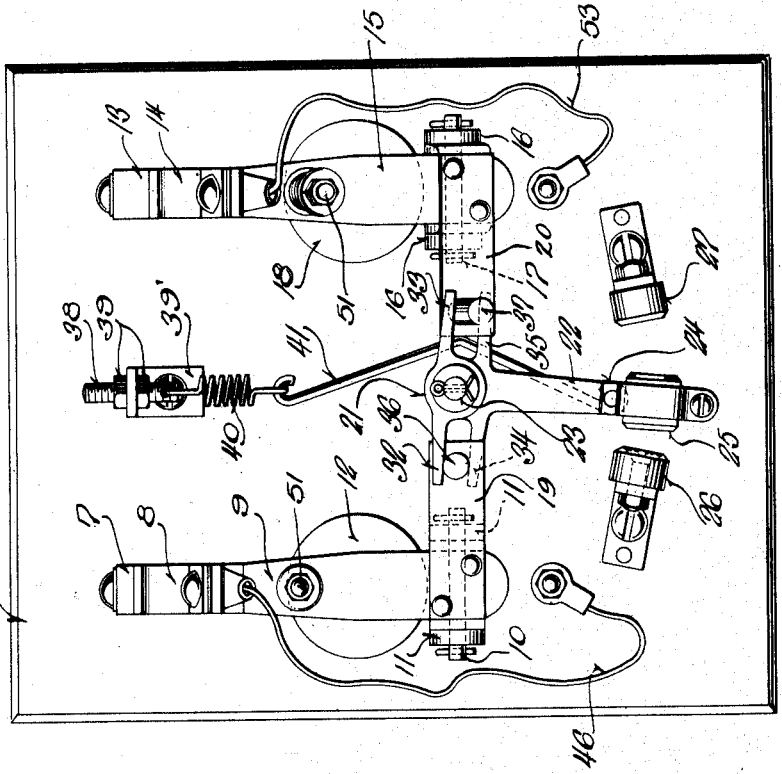
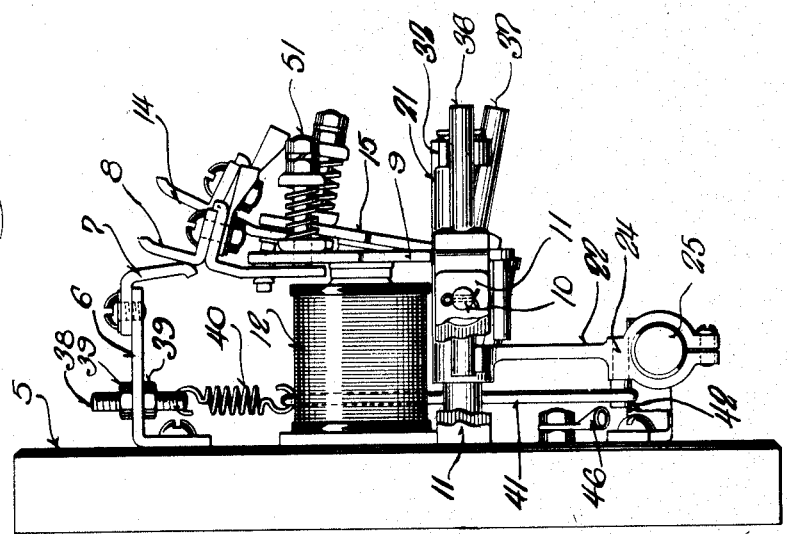
Inventor,
Gustav O. Wilms
By Ira M. Jones.
Attorney.

Sept. 25, 1928.  G. O. WILMS  1,685,113
MECHANICAL MOVEMENT
Original Filed April 3, 1922   2 Sheets-Sheet 2
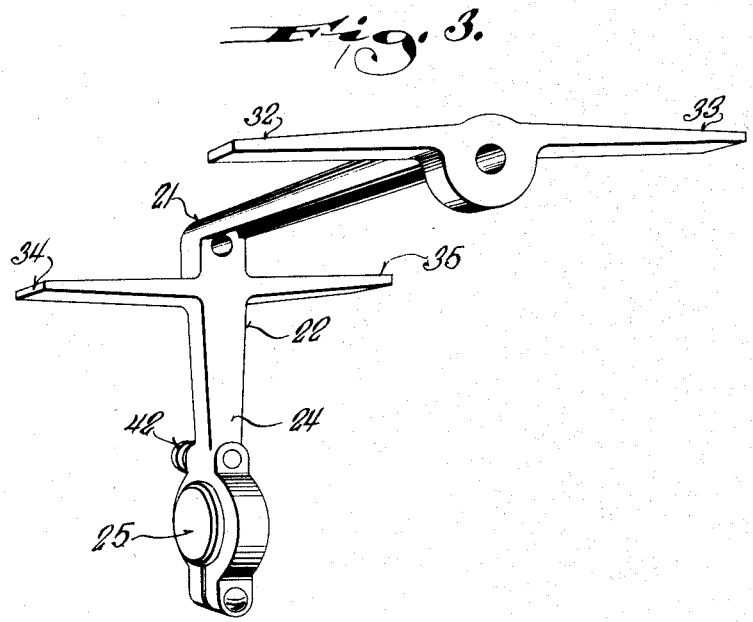

Patented Sept. 25, 1928.

1,685,113

UNITED STATES PATENT OFFICE.

GUSTAV O. WILMS, OF MILWAUKEE, WISCONSIN, ASSIGNOR TO THE RELIANCE COMPANY, OF MILWAUKEE, WISCONSIN, A CORPORATION OF WISCONSIN.

MECHANICAL MOVEMENT.

Original application filed April 3, 1922. Serial No. 549,353. Divided and this application filed November 15, 1924. Serial No. 750,163.

This invention relates to certain new and useful improvements in mechanical movements especially adapted for use with selective contact making and braking devices of that type employed in connection with magnetic switches for controlling electric circuits as, for example, circuits for reversing motors arranged for plugging or dynamic braking, and is a division of my application Serial Number 549,353, filed April 3, 1922, which matured into Patent No. 1,522,766 on January 13, 1926.

This invention has for one of its objects to provide a mechanical movement for selective contact making and braking devices having two independent movable members mechanically interlocked to insure one being opened when the other is closed.

In the operation of polyphase squirrel cage motors controlled by magnet switches, it is often desirable to automatically stop the motor quickly by plugging, that is, by quickly disconnecting the motor and reconnecting it at once to the supply line with one phase reversed, this connection being maintained until the speed diminishes to a very few revolutions per minute or until the motor comes to rest. Ordinarily two double pole double throw magnetic switches are necessary, or two mechanical interlocking magnetic switches with spring closed down contacts are required, together with a third two pole single throw magnetic switch if the motor is to be operated in both forward and reverse directions and if it is desired to stop the same quickly by plugging.

It is, therefore, another object of this invention to accomplish the same result, before described, by employing only two double pole single throw magnetic switches in which the contact making and braking device serves as a mechanical interlock for the double pole switches and selects switches, together with the circuits which they control, in proper sequence, so that as long as the forward switch is operated to start the motor, the reverse switch is selected for plugging and when the reverse switch is operated to start the motor, the forward switch is selected for plugging.

This invention as a still further object contemplates the provision of a selector switch construction operatively connected with a forward and reversing switch so that, the breaking of the circuit at either the forward or reversing switch will short circuit the armature of a direct current motor, equipped with two separate series fields, through the proper field to thus produce a dynamic stopping effect and procure the immediate stopping of the motor.

It is a still further object of this invention to provide a switch of the type described which may be applied to various control systems and which is so mechanically constructed as to positively prevent the closing of both the reverse and the forward switches at the same time.

With the above and other objects in view which will appear as the description proceeds, my invention resides in the novel construction, combination and arrangement of parts substantially as hereinafter described, and more particularly defined by the appended claims, it being understood that such changes in the precise embodiment of the herein disclosed invention may be made as come within the scope of the claims.

In the accompanying drawings, I have illustrated one complete example of the physical embodiment of my invention constructed according to the best mode I have so far devised for the practical application of the principles thereof, and in which:

Figure 1 is a side view of a switch construction embodying my invention, a part thereof being broken away and in section to more clearly illustrate structural details;

Figure 2 is a front view thereof with the parts in the positions they occupy when the left hand switch is closed and the motor operating in one direction.

Figure 3 is a perspective view of my improved selector switch detached from the motor circuit closing switches, and Figure 4 is a diagrammatic view illustrating the various circuits.

Referring now more particularly to the accompanying drawings, in which like numerals designate like parts throughout the several views, the numeral 5 designates a support base or board of suitable insulating material upon which the switch mechanisms are mounted. Fixed on base 5, to one side and near the upper end thereof, is a standard 6 carrying on its outer end a stationary contact 7 which cooperates with a movable contact 8 on one end of an armature 9. The other end of the armature is pivotally secured, by a pin 10, between the sides of a substantially U-shaped bracket member 11 and positioned medially of the armature is a magnet coil 12 which is included in the circuit of a suitable control mechanism (not shown) such as a shipper rod, or the like.

Also mounted on the other side of base 5 adjacent the upper end thereof is a switch construction including a supporting standard carrying a stationary contact 13 adapted to be engaged by a movable contact 14 fixed to one end of an armature 15. The other end of armature 15 is pivotally secured between the sides of a substantially U-shaped bracket member 16, by a pin 17, a magnet coil 18 being positioned medially of the armature and adapted, upon energization, to draw the armature theretoward, electrically connecting contacts 13 and 14. In the present illustration, the switch on the left side of the base is a reversing switch and the other a forward switch.

Mounted on the pivoted ends of armatures 9 and 15 are two inwardly projecting arms 19 and 20, respectively, arranged at substantially right angles with respect thereto with their inner adjacent ends spaced and terminating adjacent the opposite sides of the hub 21 of a selector switch 22, to be later described, which is journaled on a pin or post 23 carried by base 5.

Angularly projected from hub 21 is an arm 24, the outer end of which is bored to provide means for securement therein of a contact member 25, the opposite faces of which protrude beyond the sides of the arm for selective electrical connection with spaced fixed contacts 26 and 27 connected by conductors 28 and 29, respectively, with fields 31 and 30, respectively, of a series motor "M".

The selector switch may be moved through an angle about pin 23 as an axis, equal to the distance between contacts 26 and 27, and arms 32 and 33 are formed on the outer end of hub 21 and project in opposite directions in front of the arms 19 and 20, respectively. Extended in opposite directions from the inner end of hub 21 are arms 34 and 35, said arms being parallel to arms 32 and 33, but back of arms 19 and 20, respectively, and not in a vertical plane with arms 32 and 33.

A pin 36 extends through arm 19 and makes substantially an angle of 90 degrees with the face thereof and has its inner end engageable with the upper face of arm 34 and its outer face engageable with the lower face of arm 32. Arm 19, being made fast to armature or movable member 9, turns on pin 10 as an axis when member 9 moves and the distance from the center of pin 10 to arm 32 is substantially twice that from said pin to arm 34. Consequently, when pin 36 is in engagement with arm 34 the angle through which the selector switch moves, as member 9 moves through an angle, is only one-half of the angle through which the selector switch moves when pin 36 is in engagement with arm 32 and member 9 moves through an equal angle.

Extended through arm 20 is a pin 37 which is substantially identical with pin 36 and which works in connection with arms 33 and 35 in the same manner pin 36 works with respect to arms 32 and 34, and, therefore, further description thereof is deemed unnecessary.

A threaded stud 38 extends through a bracket 39' carried by base 5, and is locked in any desired position of adjustment by nuts 39 on either side of the bracket. A spring 40 has an eye-loop bent in either end, one end passing through an aperture drilled through stud 38 and the other end carries a link 41, the opposite end of which engages a pin 42 carried by arm 24 of the selector switch near the outer end thereof. Link 41, as illustrated in Figure 2, has its medial portion bowed or bent to prevent interference with the movement thereof by pin 23, and spring 40 and link 41 exert a force tending to move the selector switch toward contact 26 when arm 24 is in the left half of its arc, with reference to Figure 2, and to move it toward contact 27 when the same as in the right half of the arc.

The positive line 43 of the feed wires is electrically connected to the pivot pin or post 23 from which leads a conductor 44 to the armature "A" of the motor and with contacts 7 to 8 closed, as illustrated in Figure 2, the circuit is through armature "A", field 30, a conductor 45 to contact 8 through a lead 46, contact 7 and out through the negative side of the line 47. With the parts in this position, contacts 25 and 26 of the selector switch are in spaced relation and the force of spring 40 tends to engage said contacts. As illustrated in the diagrammatic view, magnet coils 12 and 18 are connected with a controlling device S, which may be a manually actuated switch, or any other type of control, by a wire 48 leading to the movable contact C of the control and wires 49 and 50 leading to the fixed contacts C and C', respectively of the controlling device, the wire 48 being connected with the line 47, the conductor 49 being connected with one side of the magnet coil 12 and the conductor 50 being connected with one side of the magnet coil 18, the other sides of the magnet coils being connected with the conductor 43 of the line by wires 12' and 18', respectively.

With the parts as illustrated in Figure 2, conductors 48 and 49 are electrically connected through the control mechanism, S;

coil 12 is energized; contacts 7 and 8 are electrically engaged and motor "M" operates in reverse direction.

When conductors 48 and 49 are electrically disconnected by actuation of the control device S, coil 12 is deenergized and contacts 7 and 8 electrically disconnected by a spring 40 and the resilient or yielding connection 51 between contact 8 and armature 9 and the selector switch arm 24 moved to the left, with reference to Figure 2, to electrically connect contacts 25 and 26. With contacts 25 and 26 electrically connected armature "A" is short circuited through field 31 to dynamically brake the motor. This circuit is then through positive side of armature "A".

With the parts in the position just described, that is, both the forward and reverse switches open and contacts 25 and 26 electrically connected, an electrical connection between conductors 48 and 50 at the control mechanism, will energize coil 18 causing armature 15 to electrically engage contacts 13 and 14. The circuit is then through field 31, which is connected to the armature with its polarity reversed to that of field 30, and the motor operates in a forward direction, that is in a direction reverse to that direction when contacts 7 and 8 are electrically connected. The current then flows through conductor 43, post 23, conductor 44, armature "A", field 31, conductor 52, contact 14, contact 13 and then out through the negative side of the line 47. The movement of armature 15 toward its coil 18 breaks the electric connection between contacts 25 and 26 prior to the engagement of contacts 13 and 14 and the selector switch arm 24 is moved to the right side of its arc with contacts 25 and 27 retained in spaced relation.

When lines 48 and 50 are electrically disconnected by operation of the control device, contacts 13 and 14 separate and contacts 25 and 27 are electrically connected in the manner described in connection with contacts 25 and 26, and armature "A" then short circuited through field 30, by conductor 45, conductor 29, contacts 27 and 25, pivot 23 and conductor 44.

As will be readily obvious, this improved mechanical movement permits the provision of a switch construction capable of use in connection with the operation of polyphase squirrel cage motors to stop the same by plugging without in any manner altering the principle of operation as described in connection with dynamic braking of the motor.

What I claim as my invention is:

1. A mechanical movement, comprising a movable member, an arm movable between predetermined spaced points, means normally urging the arm to engage either of said points, a connection between said member and arm whereby a movement of the member to one position moves the arm against its urging means to one side of an imaginary line drawn between the points from where the urging means tends to move the arm toward the adjacent point, and means holding the arm spaced from the adjacent point against its urging means, said last means permitting the arm to be moved by its urging means to complete its movement toward the adjacent point upon the reverse movement of the member a predetermined distance.

2. A mechanical movement, comprising a movable member, an arm movable between a pair of spaced points, means normally urging the arm to engage either one of said points, a connection between said member and arm whereby a movement of the member to one position moves the arm against its urging means to one side of an imaginary line drawn between the points from where the urging means tends to move the arm toward the adjacent point, means holding the arm spaced from said adjacent point against its urging means, said last means permitting the arm to be moved by its urging means to complete its movement toward the adjacent point upon the reverse movement of the member a predetermined distance, a second movable member, a connection between the second movable member and arm whereby movement of said member to one position moves the arm against its urging means to the other side of the imaginary line drawn between the points from where the urging means tends to move it toward the other point, and means connected with the second movable member and holding the arm spaced from said last-mentioned point against its urging means and permitting the arm to be moved by its urging means to complete its movement toward the last-mentioned point upon the reverse movement of the second mentioned member a predetermined distance.

3. A mechanical movement, comprising a movable member, an arm movable between a pair of spaced points, means normally urging the arm to engage either one of said points, a connection between said member and arm whereby a movement of the member to one position moves the arm against its urging means to one side of an imaginary line drawn between the points from where the urging means tends to move the arm toward the adjacent point, means holding the arm spaced from said adjacent point against its urging means, said last means permitting the arm to be moved by its urging means to complete its movement toward the adjacent point upon the reverse movement of the member a predetermined distance, a second movable member, a connection between the second movable member and arm whereby movement of said member to one position moves the arm against its urging means to the other side of the imaginary line drawn between the points from where the urging means tends to move it toward said other point, means connected with the second movable member and holding the arm spaced from said last-mentioned point against its urging means and permitting the arm to be moved by its urging means to complete its movement toward the last-mentioned point upon the reverse movement of the member a predetermined distance, and means restraining one movable member from operation while the other is in its position holding the arm spaced from its adjacent point on the side of the imaginary line to which the arm has been moved by the member.

4. A mechanical movement, comprising a movable member, an arm movable between predetermined spaced points, means normally urging the arm toward one of said points, and a connection between said member and arm, whereby a movement of the member to one position will move the arm to one side of an imaginary line drawn between the points but spaced from the adjacent point and a reverse movement of the member a predetermined distance will permit the arm to complete its movement toward the adjacent point under the action of said urging means.

5. A mechanical movement, comprising a base member, an arm, means pivotally mounting the arm on the base member for swinging movement on a plane substantially parallel with the surface of the base member, stops mounted on the base member in spaced relation and with which the outer end portion of the arm is selectively engageable, means yieldably urging the outer end portion of the arm toward either of said stops, a pair of actuating members, means mounting the actuating members on the base member for movement toward and away from the base member, and an interlock between the actuating members and arm, whereby movement of one actuating member toward the base member swings the outer end portion of the arm to one side of an imaginary line drawn through the pivot of the arm from a point between the spaced stops and a corresponding movement of the other actuating member swings the outer end portion of the arm to the other side of the imaginary line.

In testimony whereof I affix my signature.
GUSTAV O. WILMS.